(12) United States Patent
Tracht

(10) Patent No.: US 7,390,015 B2
(45) Date of Patent: *Jun. 24, 2008

(54) VEHICLE SEAT COMPONENT SIDE AIR BAG MODULE HAVING AIR BAG GUIDE INCLUDING FLEXIBLE INNER AND OUTER PANELS ATTACHED TO A SEAT PAD ATTACHMENT WIRE AND TO THE SEAT COMPONENT FRAME

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 415 days.

This patent is subject to a terminal disclaimer.

(21) Appl. No.: 10/904,857

(22) Filed: Dec. 1, 2004

(65) Prior Publication Data

US 2006/0113772 A1 Jun. 1, 2006

(51) Int. Cl.
*B60R 21/16* (2006.01)
(52) U.S. Cl. .................................................. 280/730.2
(58) Field of Classification Search .............. 280/728.2, 280/728.3, 730.2; 297/216.1, 216.11, 216.12, 297/216.13, 216.14
See application file for complete search history.

(56) References Cited

U.S. PATENT DOCUMENTS

| | | | |
|---|---|---|---|
| 5,498,030 A | 3/1996 | Hill et al. | |
| 5,667,242 A * | 9/1997 | Slack et al. | ............... 280/730.2 |
| 5,678,853 A | 10/1997 | Maly | |
| 5,749,597 A | 5/1998 | Saderholm | |
| 5,762,363 A | 6/1998 | Brown et al. | |
| 5,799,971 A * | 9/1998 | Asada | ..................... 280/730.2 |
| 5,810,389 A * | 9/1998 | Yamaji et al. | ............ 280/730.2 |
| 5,816,610 A | 10/1998 | Higashiura et al. | |
| 5,860,673 A | 1/1999 | Hasegawa et al. | |
| 5,863,063 A | 1/1999 | Harrell | |
| 5,890,734 A * | 4/1999 | Saderholm | ................ 280/730.2 |
| 5,893,579 A * | 4/1999 | Kimura et al. | ............ 280/730.2 |
| 5,897,134 A * | 4/1999 | Stein et al. | ................ 280/728.3 |
| 5,927,749 A | 7/1999 | Homier et al. | |

(Continued)

FOREIGN PATENT DOCUMENTS

DE 299 23 578 U1 12/2000

(Continued)

OTHER PUBLICATIONS

U.S. Appl. No. 08/808,572, filed Feb. 28, 1997, Wu et al.

*Primary Examiner*—Faye M. Fleming
(74) *Attorney, Agent, or Firm*—Brooks Kushman P.C.

(57) ABSTRACT

A vehicle seat component (18) includes a side air bag module (18) mounted on a frame (24) within a trim cover (34) that also covers a seat pad (30). An air bag guide (44) includes flexible inner and outer panels (46, 48) that extend between a release seam (36) of the trim cover (34) and the air bag module (18) to provide a guiding function to an air bag (42) thereof as it is inflated upon deployment so as to project outwardly through the release seam (36) for use. Inner extremities (52, 56) of the flexible inner and outer panels (46, 48) are respectively secured by a first connector (66) to an in situ molded seat pad attachment wire (64) and by a second connector (68) to the seat component frame (24).

10 Claims, 4 Drawing Sheets

U.S. PATENT DOCUMENTS

| | | |
|---|---|---|
| 5,938,232 A | 8/1999 | Kalandek et al. |
| 5,967,546 A | 10/1999 | Homier et al. |
| 5,967,603 A | 10/1999 | Genders et al. |
| 6,007,091 A * | 12/1999 | Westrich .................. 280/730.2 |
| 6,045,151 A | 4/2000 | Wu |
| 6,179,324 B1 * | 1/2001 | White et al. ............. 280/730.2 |
| 6,206,410 B1 * | 3/2001 | Brown .................... 280/728.3 |
| 6,237,934 B1 | 5/2001 | Harrell et al. |
| 6,293,580 B1 * | 9/2001 | Lachat et al. ............ 280/728.3 |
| 6,352,304 B1 * | 3/2002 | Sorgenfrei ............. 297/216.13 |
| 6,357,789 B1 | 3/2002 | Harada et al. |
| 6,386,577 B1 * | 5/2002 | Kan et al. ................. 280/730.2 |
| 6,450,528 B1 * | 9/2002 | Suezawa et al. .......... 280/730.2 |
| 6,457,741 B2 * | 10/2002 | Seki et al. ................. 280/730.2 |
| 6,588,838 B1 | 7/2003 | Dick, Jr. et al. |
| 7,004,496 B2 * | 2/2006 | Bossecker et al. ......... 280/730.2 |
| 2004/0195029 A1 * | 10/2004 | Feldman .................... 180/271 |

FOREIGN PATENT DOCUMENTS

| | | |
|---|---|---|
| EP | 0 856 439 A1 | 8/1998 |

* cited by examiner

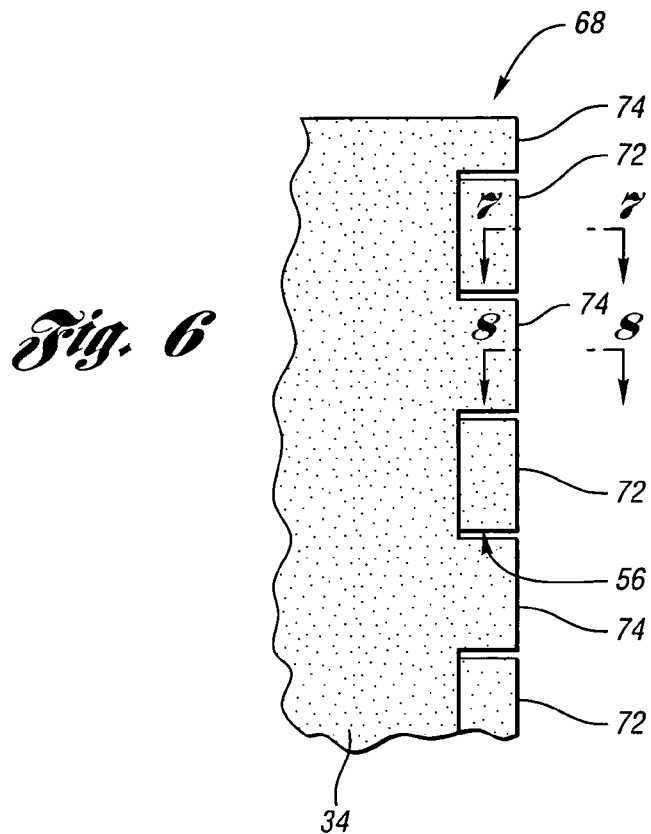
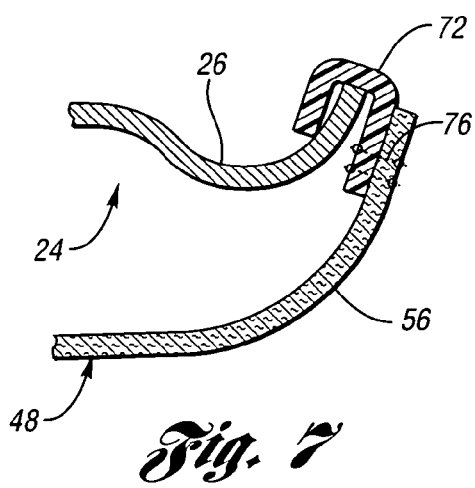
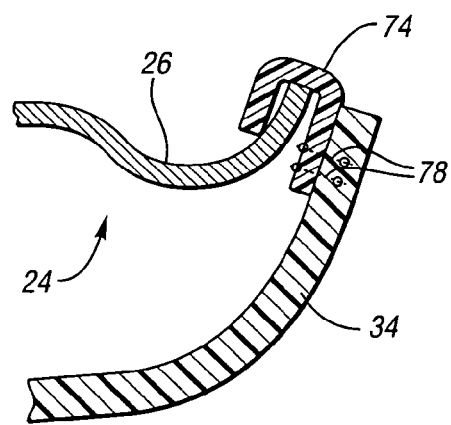
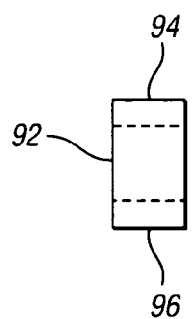

VEHICLE SEAT COMPONENT SIDE AIR BAG MODULE HAVING AIR BAG GUIDE INCLUDING FLEXIBLE INNER AND OUTER PANELS ATTACHED TO A SEAT PAD ATTACHMENT WIRE AND TO THE SEAT COMPONENT FRAME

BACKGROUND OF THE INVENTION

1. Field of the Invention

This invention relates to a vehicle seat component side air bag module having an air bag guide with flexible inner and outer panels having inner extremities respectively secured to a seat pad attachment wire and a frame of the seat component.

2. Background Art

Vehicle seat components have previously included side air bag modules and conventionally include trim covers that have an air bag release seam through which an air bag upon deployment is projected outwardly from within the seat to provide occupant protection. See, for example, U.S. Pat. No. 5,816,610 Higashiura et al.; U.S. Pat. No. 5,860,673 Hasegawa et al.; and U.S. Pat. No. 5,938,232 Kalandek et al. Different constructions have been utilized to permit passage of the air bag past foam seat padding when inflated by an inflator for movement from within the pad outwardly through the trim cover release seam. For example, U.S. Pat. No. 6,045,151 Wu discloses a seat pad having a slot through which the air bag moves from an air bag module to the release seam and also discloses a cloth sleeve that extends entirely about the associated air bag module and to the release seam. Also, U.S. Pat. No. 6,237,934 Harrell et al. and U.S. Pat. No. 6,588,838 Dick, Jr. et al., both of which are assigned to the assignee of the present invention, disclose air bag modules wherein the air bag module is located closely adjacent to the release seam to facilitate the air bag deployment.

SUMMARY OF THE INVENTION

An object of the present invention is to provide an improved vehicle seat side air bag module for providing seat occupant protection.

A vehicle seat component constructed in accordance with the invention includes a frame for mounting on an associated vehicle on which the vehicle seat component is to be used. A molded foam seat pad is mounted by the frame and has a side extremity, and the seat pad includes an attachment wire molded in situ. A trim cover extends over the seat pad and has an air bag release seam adjacent the side extremity of the seat pad. An air bag module is mounted on the frame within the trim cover in a spaced relationship from its air bag release seam. The air bag module includes an inflator and an air bag that is inflated by the inflator and projected outwardly from the seat component through the air bag release seam of the trim cover. An air bag guide of the seat component includes an inner panel and an outer panel that are each made of flexible material and have outer and inner extremities with their outer extremities connected to the trim cover adjacent the air bag release seam. The flexible inner and outer panels extend alongside each other from their outer extremities to the air bag module and thence respectively inwardly and outwardly of the air bag module. A first connector secures the inner extremity of the flexible inner panel to the attachment wire of the seat pad, and a second connector secures the inner extremity of the flexible outer panel to the frame in a spaced location from the inner extremity of the flexible inner panel.

The flexible inner panel extends from its outer extremity to the air bag module and thence in a skewed angular relationship from the air bag module to the first connector.

The flexible outer panel extends from its outer extremity to the air bag module and thence along the air bag module to the second connector.

The inner extremity of the flexible inner panel includes an end retainer and the first connector may be wires, plastic strips or combinations of wires and plastic strips that secure the end retainer to the attachment wire of the seat pad.

The flexible outer panel and the trim cover extend along and around the air bag module with a portion of the seat pad therebetween, and the flexible outer panel and the trim cover extend around the air bag module to the second connector that secures the inner extremity of the flexible outer panel and the trim panel to the frame.

The second connector includes a hook shaped retainer that is secured to both the inner extremity of the flexible outer panel and to the trim panel and that is hooked to the frame.

The air bag release seam includes stitching through bent seam ends of the trim cover and through the outer extremities of the flexible inner and outer panels.

The vehicle seat component has particular utility as a seat back, especially with its one side extremity at an outboard location to provide protection from adjacent vehicle structure.

The objects, features and advantages of the present invention are readily apparent from the following detailed description of the preferred embodiment when taken in connection with the accompanying drawings.

BRIEF DESCRIPTION OF THE DRAWINGS

FIG. 3a is a partial view illustrating a modification of a trim cover which includes an extension for attachment to a frame of the seat back component.

FIG. 6 is a view taken along the direction of line 6-6 in FIG. 3 to illustrate the attachment of an inner extremity of a flexible outer panel of the air bag guide and the seat component trim cover to the seat component frame.

FIG. 7 is a sectional view taken along the direction of line 7-7 in FIG. 6 to show the attachment of the inner extremity of the flexible inner panel of the air bag guide to the frame.

FIG. 8 is a sectional view taken along the direction of line 8-8 in FIG. 6 to illustrate the attachment of the trim cover to the frame.

FIG. 9 shows a plastic strip embodiment of the first connector shown in FIG. 5 as a bent wire embodiment.

DETAILED DESCRIPTION OF THE PREFERRED EMBODIMENT

Figure 1:
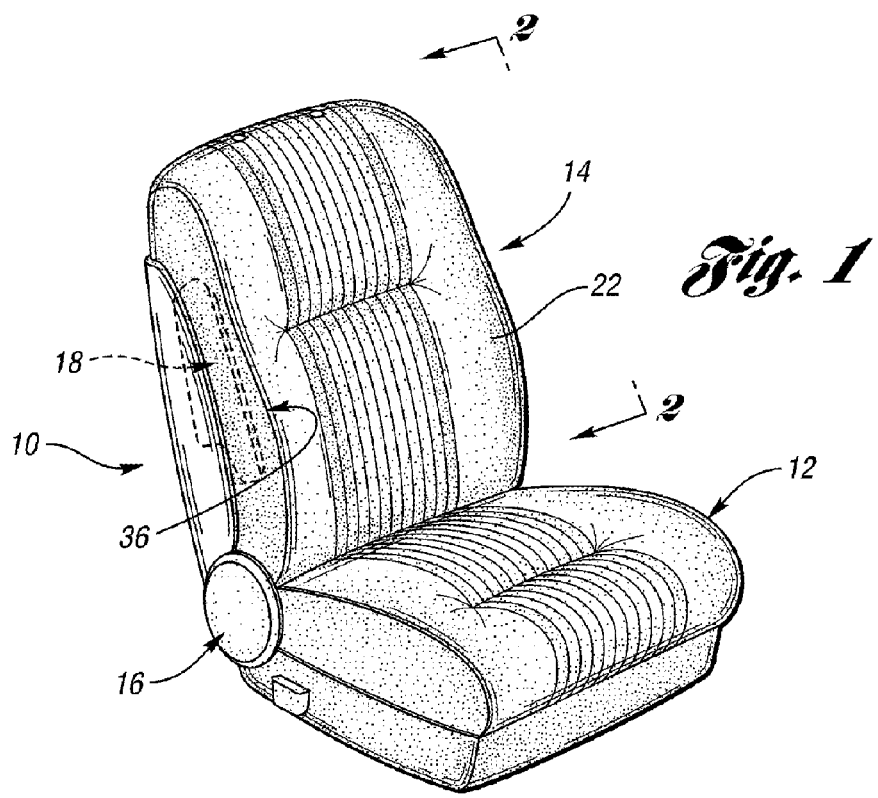
FIG. 1 is a perspective view of a vehicle seat including a seat back component constructed in accordance with the invention to include a side air bag module that is shown by hidden line illustration.
Figure 2:
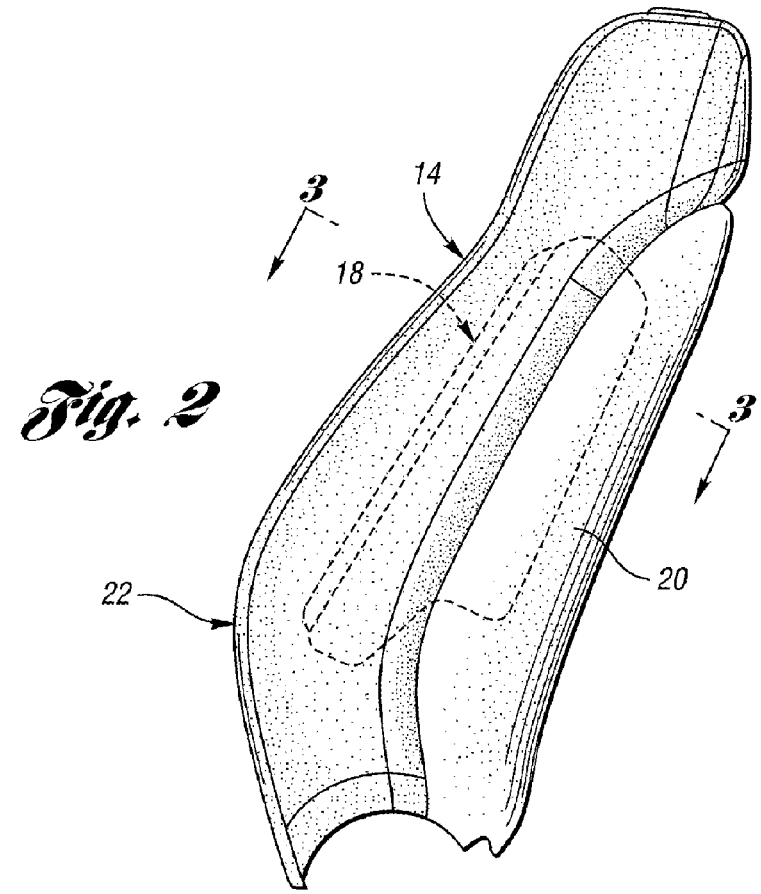
FIG. 2 is a side elevational view of the vehicle seat back component taken along the direction of line 2-2 in FIG. 1 with the side air bag module thereof also illustrated by hidden line representation.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 16. The seat back component 14 includes a side air bag module 18 that is constructed in accordance with the present invention as it is hereinafter more fully described and operable to provide seat occupant protection. While the side air bag module 18 is shown on the seat back 14, which is a usage for which it has particular utility, it is also possible for the side air bag module to be utilized with a seat bottom 12 even though the seat back usage is specifically disclosed. Also, as illustrated, the side air bag module 18 is located at an outboard lateral side or extremity of the seat to provide protection against adjacent vehicle structure, but it is also possible to have the side air bag module located at the inboard lateral side to provide protection against an adjacent vehicle occupant and to also have side air bag modules at both outboard and inboard locations for protection in both lateral directions. As shown in FIG. 2, the seat back 14 includes a back panel 20 that is conventionally molded from plastic and also includes a front cushion 22 against which the seat occupant leans to provide back support and in which the side air bag module 18 is located.

Figure 3:
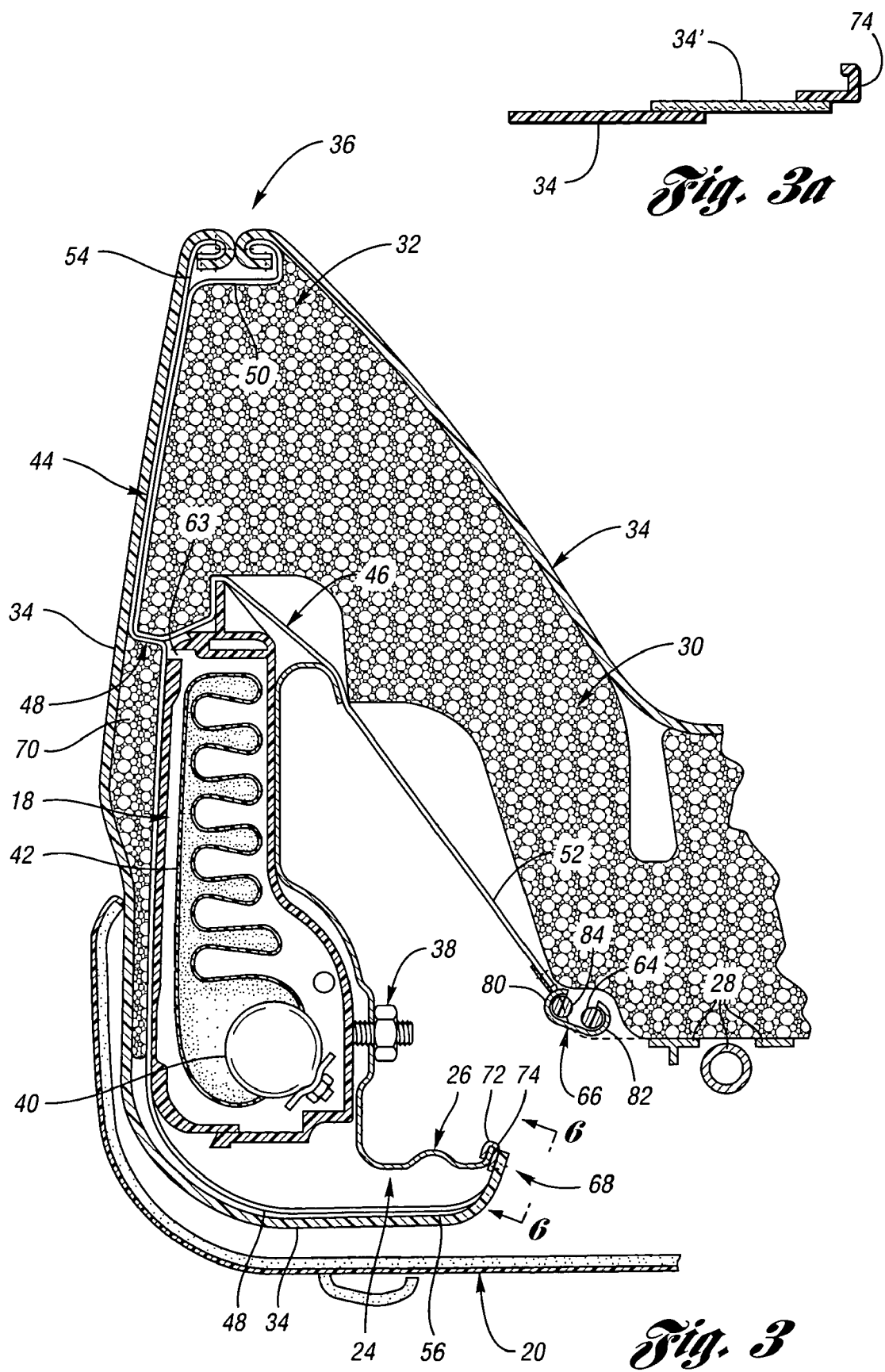
FIG. 3 is a partial sectional view taken through the seat back component along the direction of line 3-3 in FIG. 2 to further illustrate the construction of the side air bag module within the seat back component.

As shown in FIG. 3, the seat back component 14 includes a frame collectively identified by 24 and having a pair of frame members 26 (only one shown) at its opposite lateral sides as well as having frame tubes and other components all of which are identified by 28. A foam seat pad 30 is mounted on the frame 24 in any conventional manner and has opposite side extremities 32 spaced laterally from each other at the opposite lateral sides of the seat. A trim cover generally indicated by 34 extends over the seat pad 30 and includes an air bag release seam 36 adjacent the left side extremity 32 of the seat pad which, as previously mentioned, corresponds to an outboard location. The side air bag module 18 is located within the trim cover 34 mounted on the frame 24, specifically by a thread connection 38 on the one side frame member 26 adjacent the air bag release seam 36 but in a spaced relationship from the release seam. The air bag module 18 includes an inflator 40 and a schematically illustrated folded air bag 42 which may be folded or rolled and, upon deployment, the air bag is inflated by the inflator to project outwardly from the seat component through the air bag release seam 36 of the trim cover 34.

The trim cover 34 may be made of cloth, vinyl or leather, etc. In some embodiments, the trim cover 34 within the back panel 20 includes an extension 34' secured thereto by stitching and/or adhesive, etc. for securement to the seat component structure as is hereinafter described. Such trim cover extensions can be made of any sufficiently strong and flexible material and can reduce the total cost of the trim cover without losing any aesthetic appeal since the back panel 20 hides the trim cover extension.

With continuing reference to FIG. 3, an air bag guide of the seat back component is generally indicated by 44 and includes an inner panel 46 and an outer panel 48 that are each made of a flexible material such as a suitable cloth. The flexible inner panel 46 has an outer extremity 50 adjacent the air bag release seam 36 and also has an inner extremity 52 as is hereinafter more fully described. The flexible outer panel 48 has an outer extremity 54 adjacent the air bag release seam 36 and has an inner extremity 56 which is hereinafter more fully described.

Figure 4:
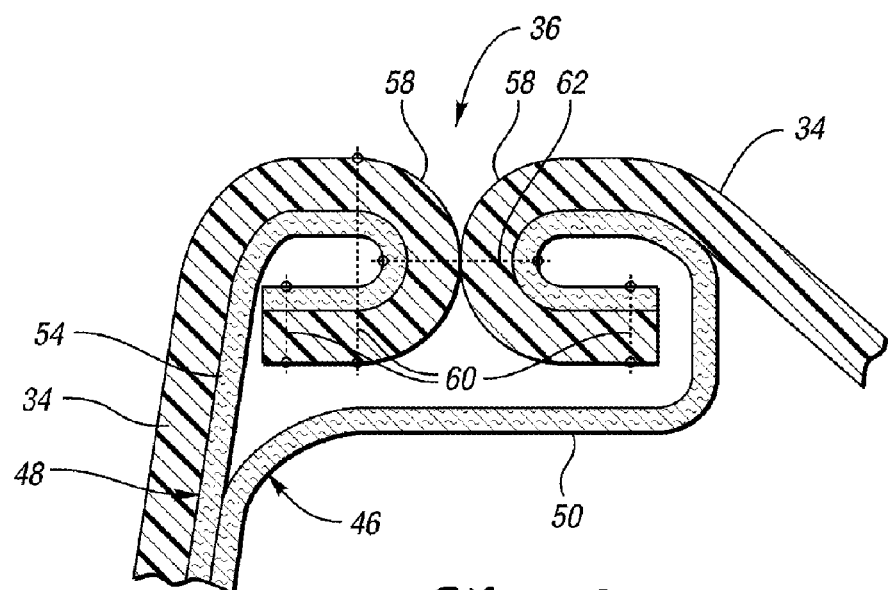
FIG. 4 is an enlarged view of a portion of FIG. 3 illustrating an air bag release seam of a trim cover of the seat back component.

As shown in FIG. 4, the air bag release seam 36 includes bent seam ends 58 of the trim cover 34 and the outer extremities 50 and 54 of the flexible inner and outer panels 46 and 48. Stitching 60 provides securement of the flexible panel outer extremities 50 and 54 to the trim cover 34 and stitching 62 provides securement of the bent ends 58 to each other.

From the air bag release seam 36 illustrated in FIG. 4, the flexible inner and outer panels 46 and 48 extend alongside each other as shown in FIG. 3 from their outer extremities 50 and 54 to the side air bag module 18 and thence inwardly and outwardly thereof for connection within the seat back component as is hereinafter more fully described. Upon deployment of the side air bag module 18, the air bag 42 moves through a module opening 63 and thence between the flexible inner and outer panels 46 and 48 which then provide a guiding function of the air bag 42 as it moves between the panels toward the air bag release seam 36 and eventually tears open the release seam for outward projection of the air bag to provide the occupant protection. The inner and outer flexible panels 46 and 48 may be made of any suitable flexible material effective to guide the air bag 42 from the module to the release seam. For example, a woven or non-woven cloth material, which may include natural materials or a synthetic material such as nylon. One material that is found to be effective is a polyester material of the type from which the air bag 42 may be manufactured. Regardless of the type of material used to make the air bag guide 44, the use of the air bag guide can be helpful in reducing friction on the air bag 42 as it is deployed. Although a polymer such as nylon may be particularly beneficial, even a fleece material will help reduce the friction on the air bag 42 because the air bag guide 44 prevents contact between the deploying air bag 42 and the seat pad 30.

Figure 5:
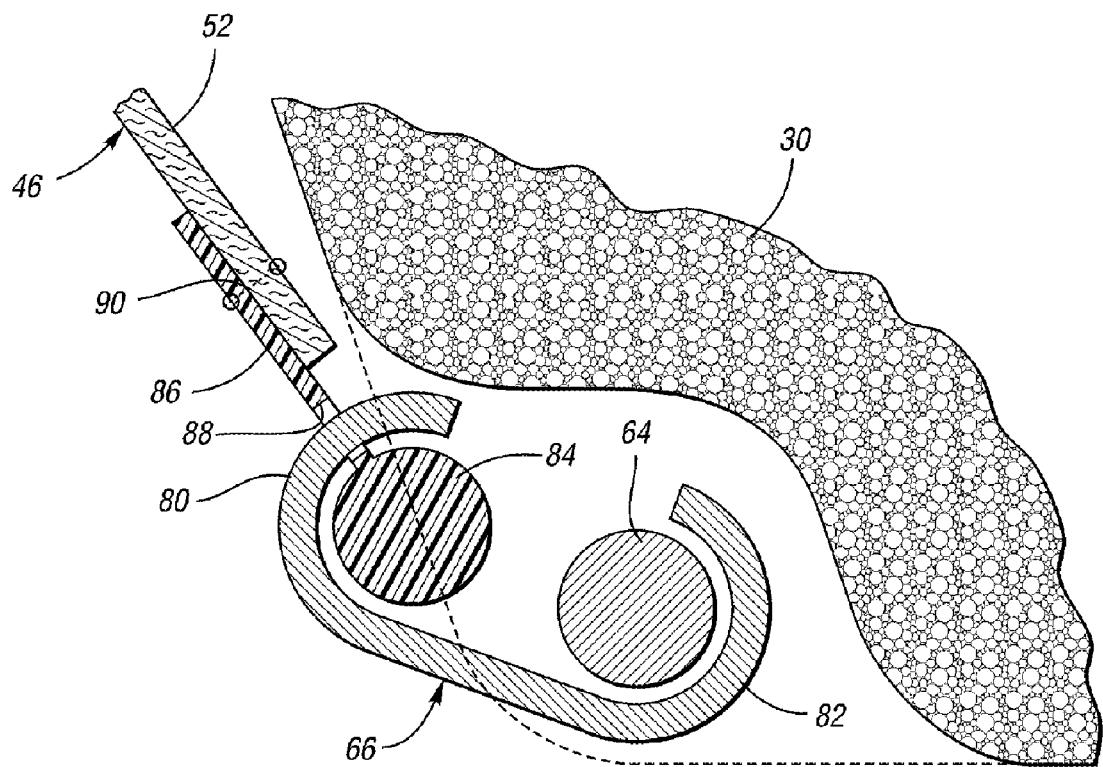
FIG. 5 is an enlarged view of a portion of FIG. 3 illustrating the manner in which an inner extremity of an air bag flexible inner panel is secured by a first connector to an attachment wire of a foam seat pad.

As illustrated in FIGS. 3 and 5, an attachment wire 64 is molded in situ within the foam seat pad 30, and a first connector 66 connects the inner extremity 52 of the air bag flexible inner panel 46 so as to secure the inner panel during deployment of the air bag as it is inflated by the inflator and guided by the air bag guide previously described.

As illustrated in FIGS. 3 and 6-8, a second connector indicated by 68 secures the inner extremity 56 of the air bag guide flexible outer panel 48 to the seat component frame 24 at its shown frame member 26 in a spaced location from the inner extremity 52 of the air bag guide flexible inner panel.

Securement of the inner extremities 52 and 56 of the flexible inner and outer panels 46 and 48 as described above at spaced locations from each other distributes the loading applied by the air bag guide to the seat component during the air bag deployment.

The flexible inner panel 46 as shown in FIG. 3 extends from its outer extremity 50 to the air bag module 18 and thence in a skewed angular relationship from the air bag module to the first connector 66. Furthermore, the flexible outer panel 48 extends from its outer extremity 54 to the air bag module 18 and thence along the air bag module to the second connector 68.

With continuing reference to FIG. 3, the flexible outer panel 48 and the trim cover 34 extend along and around the air bag module 18 with a portion 70 of the seat pad 30 therebetween. Furthermore, the flexible outer panel 48 and the trim cover 34 extend around the air bag module to the second connector 68 which provides the securement to the frame 24 at the frame member 26 shown.

The second connector 68 is more fully illustrated in FIGS. 6-8 as having a hook shaped retainer construction including hook shaped retainer portions 72 and 74 that are respectively secured by stitching 76 and 78 or otherwise to the inner extremity 56 of the flexible outer panel 48 and to the inner extremity of the trim cover 34 or its extension as previously described in connection with FIG. 3a.

As shown in FIG. 3, the foam seat pad portion 70 is located between the flexible outer panel 48 extending along the air bag module 18 and the adjacent portion of the trim cover 34 extending from its exterior location to the back panel 20. The hook shaped retainer portions 72 and 74 alternate with each other as shown in FIG. 6 and permit the inner extremity 56 of the flexible outer panel 48 to be initially secured to the associated frame member 26 of frame 24 prior to the installation of the foam seat pad portion 70 shown in FIG. 3. Thereafter, the trim cover 34 is wrapped around this foam pad portion 70 and its retainer portions 74 are secured to the same frame member 26 of the frame 24 in an alternating relationship with the retainer portions 72 that secure the inner extremity of the flexible outer panel as previously described.

With reference to FIG. 5, the first connector 66 is a wire having hooked ends 80 and 82 that are respectively attached to the inner extremity 52 of the flexible inner panel 46 and to the in situ molded attachment wire 64 of the foam seat pad 30. An attachment bead 84 having a web 86 extending therefrom has a hole 88 through which the first hook end 80 is inserted so as to extend around the bead 84 for attachment. Stitching 90 secures the web 86 to the flexible inner member inner extremity 52. It is also possible for the wire connector 66 to have a C shape that is deformed upon assembly to a closed shape around both the seat pad attachment wire and the attachment bead of the flexible inner panel inner extremity being secured, such C-shaped wire connectors being referred to as "hog rings" in the vehicle industry.

As shown in FIG. 9 the first connector 66 can also be constructed as a plastic strip 92 having hooked ends 94 and 96 for providing securement.

While the side air bag module 18 described above has particular utility for use with a vehicle seat back, especially at its outboard location, it is also possible for the side air bag to be utilized with other vehicle seat components such as with a seat bottom.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat component comprising:
   a frame for mounting on an associated vehicle on which the vehicle seat component is to be used;
   a molded foam seat pad mounted by the frame and having a side extremity, and the seat pad including an attachment wire molded in situ;
   a trim cover extending over the seat pad and having an air bag release seam adjacent the side extremity of the seat pad;
   an air bag module mounted on the frame within the trim cover in a spaced relationship from the air bag release seam, and the air bag module including an inflator and an air bag that is inflated by the inflator to project outwardly from the seat component through the air bag release seam of the trim cover;
   an air bag guide including an inner panel and an outer panel that are each made of flexible material and have outer and inner extremities with their outer extremities connected to the trim cover adjacent the air bag release seam, the flexible inner and outer panels extending alongside each other from their outer extremities to the air bag module and thence respectively inwardly and outwardly thereof;
   a first connector for securing the inner extremity of the flexible inner panel to the attachment wire of the seat pad; and
   a second connector for securing the inner extremity of the flexible outer panel to the frame in a spaced location from the inner extremity of the flexible inner panel.

2. A vehicle seat component as in claim 1 wherein the flexible inner panel extends from its outer extremity to the air bag module and thence in a skewed angular relationship from the air bag module to the first connector.

3. A vehicle seat component as in claim 1 wherein the flexible outer panel extends from its outer extremity to the air bag module and thence along the air bag module to the second connector.

4. A vehicle seat component as in claim 1 wherein: the flexible inner panel extends from its outer extremity to the air bag module and thence in a skewed angular relationship to the first connector; and the flexible outer panel extends from its outer extremity to the air bag module and thence along the air bag module to the second connector.

5. A vehicle seat component as in claim 1 wherein the inner extremity of the flexible inner panel includes an end retainer and the first connector is selected from the group consisting of: wires, plastic strips and combinations thereof that secure the end retainer to the attachment wire of the seat pad.

6. A vehicle seat component as in claim 1 wherein the flexible outer panel and the trim cover extend along and around the air bag module with a portion of the seat pad therebetween, and the flexible outer panel and the trim cover extending around the air bag module to the second connector that secures the inner extremity of the flexible outer panel and the trim panel to the frame.

7. A vehicle seat component as in claim 6 wherein the second connector includes a hook shaped retainer that is secured to both the inner extremity of the flexible outer panel and to the trim cover and that is hooked to the frame.

8. A vehicle seat component as in claim 1 wherein the air bag release seam includes stitching through bent seam ends of the trim cover and through the outer extremities of the flexible inner and outer panels.

9. A vehicle seat component as in claim 1 embodied as a seat back and wherein the one side extremity is at an outboard location.

10. A vehicle seat back comprising:
   a frame for mounting on an associated vehicle on which the vehicle seat back is to be used;
   a molded foam seat pad mounted by the frame and having a side extremity, and the seat pad including an attachment wire molded in situ;
   a trim cover extending over the seat pad and having an air bag release seam adjacent the side extremity of the seat pad;
   an air bag module mounted on the frame within the trim cover in a spaced relationship from the air bag release seam, and the air bag module including an inflator and an air bag that is inflated by the inflator to project outwardly from the seat back through the air bag release seam of the trim cover;

an air bag guide including an inner panel and an outer panel that are each made of flexible material and have outer and inner extremities with their outer extremities connected to the trim cover adjacent the air bag release seam, the flexible inner and outer panels extending alongside each other from their outer extremities to the air bag module and thence respectively inwardly and outwardly thereof with the flexible inner panel extending in a skewed angular relationship from the air bag module and with the flexible outer panel extending along the air bag module inwardly of a portion of the seat pad which is covered by the trim cover;

a first connector for securing the inner extremity of the flexible inner panel to the attachment wire of the seat pad; and a second connector for securing the inner extremity of the flexible outer panel to the frame in a spaced location from the inner extremity of the flexible inner panel.

* * * * *